United States Patent [19]
Wolf

[11] Patent Number: 5,937,623
[45] Date of Patent: Aug. 17, 1999

[54] ACCUMULATOR-POWERED LAWN-MOWER

[75] Inventor: Gregor Wolf, Betzdorf, Germany

[73] Assignee: Wolf-Gerate GmbH Vertriebsgesellschaft, Germany

[21] Appl. No.: 09/011,163

[22] PCT Filed: Jul. 30, 1996

[86] PCT No.: PCT/EP96/03350

§ 371 Date: May 7, 1998

§ 102(e) Date: May 7, 1998

[87] PCT Pub. No.: WO97/04638

PCT Pub. Date: Feb. 13, 1997

[30] Foreign Application Priority Data

Aug. 1, 1995 [DE] Germany ............. 195 28 167

[51] Int. Cl.$^6$ ............. A01D 69/00; A01D 69/02
[52] U.S. Cl. ................. 56/11.9; 56/1; 429/96
[58] Field of Search .................. 56/11.9, 16.7, 56/10.8, 1, 2; 429/96, 97, 98, 121

[56] References Cited

U.S. PATENT DOCUMENTS

| | | | |
|---|---|---|---|
| 2,909,885 | 10/1959 | Smith ................. | 56/11.9 |
| 3,973,378 | 8/1976 | Bartasevich et al. . | |
| 3,999,110 | 12/1976 | Ramstrom et al. ........ | 429/96 |
| 4,031,696 | 6/1977 | Fleigle ................. | 56/11.9 |
| 4,064,680 | 12/1977 | Fleigle ................. | 56/11.9 |
| 4,333,302 | 6/1982 | Thomas et al. ......... | 56/11.9 |
| 4,446,680 | 5/1984 | D'Alessandro .......... | 56/11.9 |
| 4,508,794 | 4/1985 | Wright ................. | 429/96 |
| 4,634,642 | 1/1987 | Lopez-Doriga .......... | 429/121 |
| 4,847,170 | 7/1989 | Martin .................. | 429/98 |
| 4,930,300 | 6/1990 | Benter et al. . | |
| 4,983,473 | 1/1991 | Smith .................. | 429/121 |
| 5,606,851 | 3/1997 | Bruener et al. ......... | 56/11.9 |
| 5,619,845 | 4/1997 | Bruener et al. ......... | 56/11.9 |

FOREIGN PATENT DOCUMENTS

| | | |
|---|---|---|
| 0466306 | 1/1992 | European Pat. Off. . |
| 2661066 | 10/1991 | France . |
| 2210557 | 9/1973 | Germany . |
| 9313032 | 12/1993 | Germany . |
| 188355 | 11/1922 | United Kingdom ........ 429/96 |
| 9508256 | 3/1995 | WIPO . |
| 9605719 | 2/1996 | WIPO . |

Primary Examiner—Terry Lee Melius
Assistant Examiner—Arpad Fabian Kovacs
Attorney, Agent, or Firm—Ostrolenk, Faber, Gerb & Soffen, LLP

[57] ABSTRACT

In an accumulator-powered lawn mower, the battery (10) providing power to the electric motor is accommodated in a battery housing which can be inserted into a battery compartment (28) of the lawn mower chassis. For charging purposes, the battery can be removed from the compartment and placed into a charger having a corresponding compartment with electrical contacts. On the upper side, the battery housing has a handle (12) which can pivot about a horizontal spindle (16) and is coupled to a locking mechanism (22) which engages a set of corresponding interlocking recesses (24) when the handle is folded down. Support is provided at the bottom of the compartment, preferably in the form of springs (30). The electrical contacts of the battery are independent of the mechanical attachment and include contact lugs (32) on the battery housing which extend in the longitudinal direction of the compartment and cooperate with contact springs (34) of the compartment which are supported by helical compression springs (36) in order to increase the contact pressure.

15 Claims, 2 Drawing Sheets

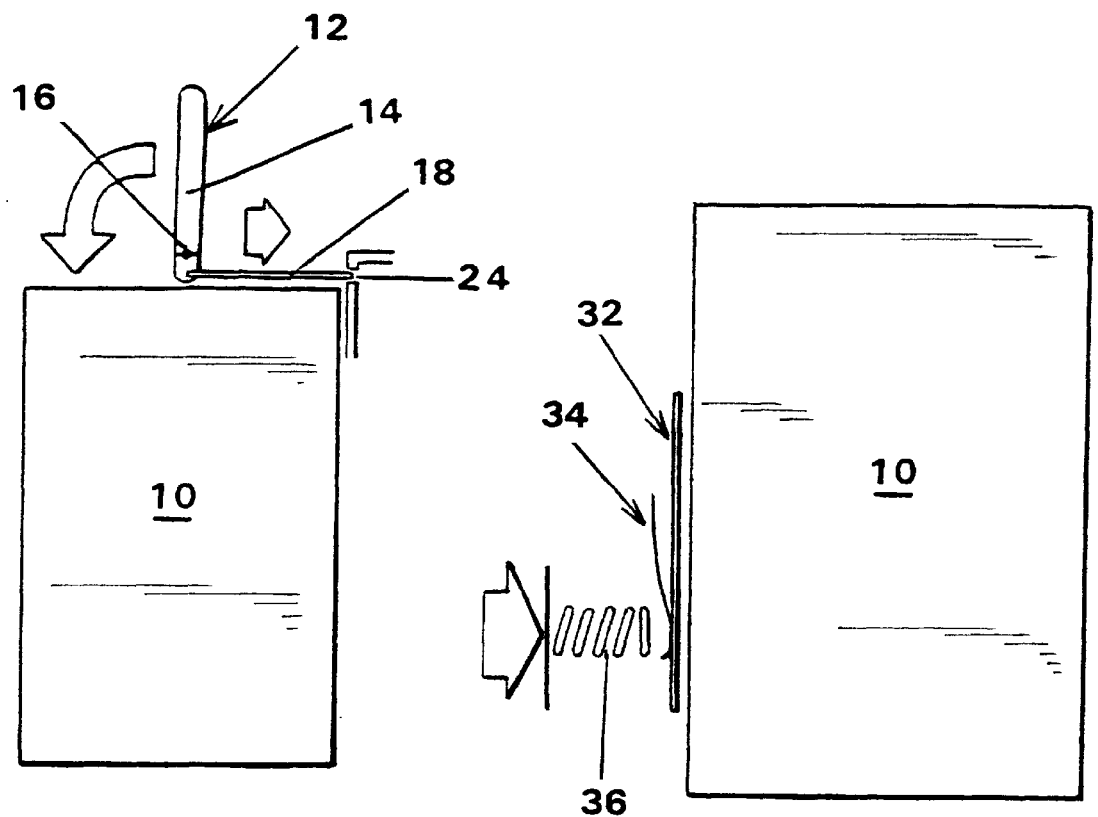
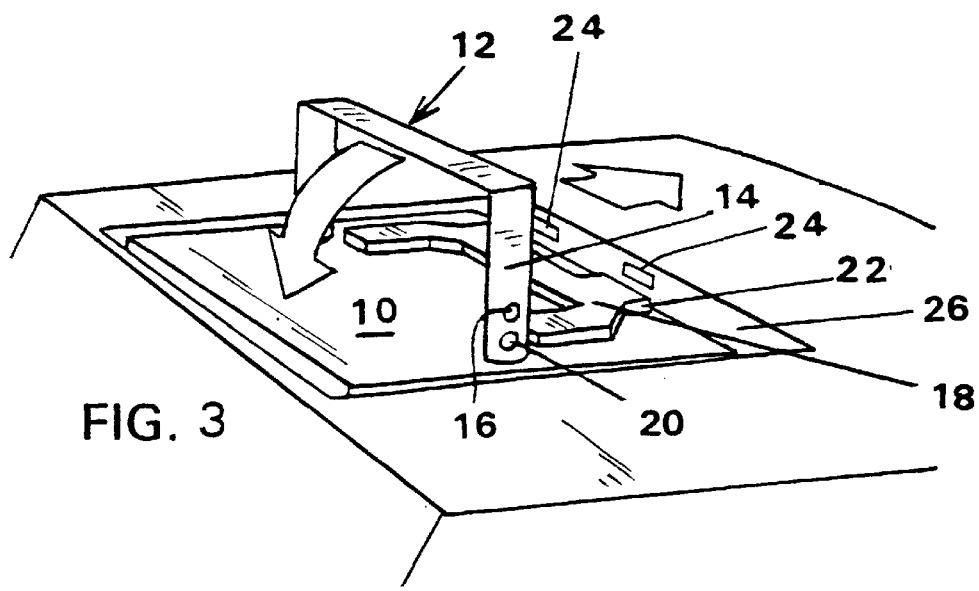

ACCUMULATOR-POWERED LAWN-MOWER

The invention relates to a lawnmower with an electric motor for driving the cutting implements which is fed by a rechargeable battery, having the features specified in the preamble of patent claim 1. Such a lawnmower is known from WO 95/08 256. In the case of the latter, the connection contacts between battery and chassis are designed as plug-in contacts, and these plug-in contacts simultaneously form a mechanical attachment means which are intended to attach the battery in a holder of the lawnmower chassis. In this case, the contact sockets attached to the battery cover are mounted in a floating manner, i.e. laterally displaceably, in this cover, in order that contacting can take place even if they are not placed exactly onto the pin connectors in the lawnmower chassis. The floating mounting means that mechanical attachment of the battery in the chassis is possible only to a limited extent. Furthermore, in particular if vibration occurs, reliable contact-making is not ensured, especially when one considers the high currents which flow during the operation of such a lawnmower.

The invention is therefore based on the object of improving the mounting of the battery in the chassis holder. The set object is achieved by the features specified in the characterizing part of patent claim 1. The battery is secured in the battery compartment in an interlocking manner by the lock bolts, and it cannot fall out from its holder even if the lawnmower is tilted or turned over for some reason or other. The locking means automatically engage when the handle joined to the battery housing is folded down. Similarly, automatic unlocking occurs when the handle is swung up, in order to grasp the battery by the handle and take it out in order that it can be charged elsewhere.

The electrical contact-making is completely separate from the mechanical attachment means. Since, according to claims 10 and 11, these contacting means are designed as sliding-action contacts, it is not necessary to overcome any great force when removing or inserting the battery, because the contacts are designed as sliding-action contacts. On the other hand, considerable forces have to be exerted if, as in the prior art, the plug-in contacts simultaneously effecting the mechanical attachment have to be plugged one into the other or pulled apart, because the plug-in contacts oppose the displacement with a much higher resistance.

The design of the sliding-action contacts according to the invention also effects a self-cleaning of the contact areas, with the result that reliable contact-making is always ensured.

Further developments of the invention emerge from the subclaims.

An exemplary embodiment of the invention is described below with reference to the drawing, in which:

FIG. 1 shows a diagrammatic representation of the battery, fitted in a lawnmower, with the attachment means;

FIG. 2 shows a diagrammatic representation of the battery with the contacting means;

FIG. 3 shows a perspective representation of the locking means coupled to the handle;

Figure 4:
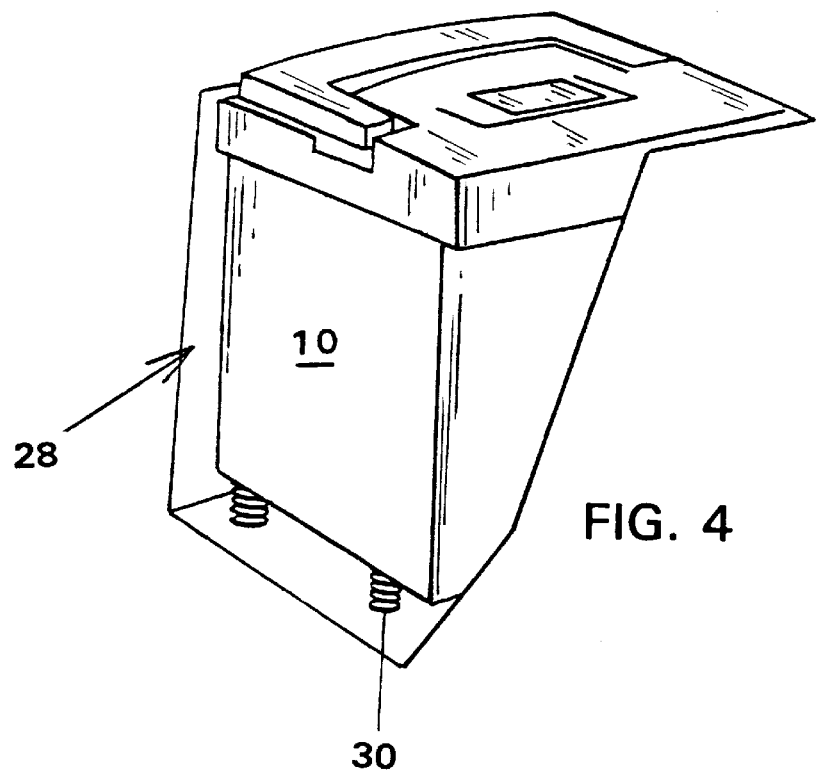
FIG. 4 shows a perspective, partially broken-open view of the battery compartment of a lawnmower with flexibly supported battery.

In the drawing, only the parts essential for the invention are represented, namely the battery, the battery holder and locking means as well as the contacting means, while the individual parts of the lawnmower are merely indicated. The lawnmower, which has on its chassis the compartment for fitting the battery, may be designed in various ways. It has, in a known way, an electric motor, which is fed by the battery 10 via connection leads (not shown). The battery 10 is an electrochemical secondary element, and nickel-cadmium batteries or lead-acid batteries primarily come into consideration for this. The battery is located in a housing, and the reference numeral 10 denotes the housing with the fitted battery.

The battery housing bears a handle 12, the side legs 14 of which can pivot about a spindle 16. At the part of the legs 14 lying under the pivot spindle 16, the legs of a bracket 18 are articulated about a spindle 20, which lies under the spindle 16. This bracket 18 has one or more, for example two, lock bolts 22 which, when the mower is in the state of readiness, engage in interlocking recesses 24 which are arranged in a wall 26 of a battery compartment 28, into which the battery with housing can be fitted. As can be seen in particular from FIGS. 1 and 3, the lock bolts 22 are inserted into the interlocking recesses 24 by folding down the handle 12, whereby the battery is secured in an interlocking manner in the vertical direction. After swinging the handle 12 up into the position which can be seen from FIGS. 1 and 2, the battery can be removed from the compartment and replaced into it. The battery 10 rests on the bottom of the compartment, on flexible supporting means. These may be formed of flexible material, for example foam, or have springs. According to the exemplary embodiment represented in FIG. 4, the supporting means comprise helical compression springs 30. These flexible supporting means prevent the battery from hitting the bottom of the compartment if there is battery movement. In order to ensure that the battery is always fitted correctly into the battery compartment, guide means, not shown in the drawing, are provided in the form of vertical ribs and grooves. A corresponding corner design of the battery housing and battery compartment is also conceivable.

The support means prestress the battery or its housing against the locking means, with the result that the battery remains securely fixed during operation.

For contacting, the battery or its housing bears in a side wall a plurality of contact lugs 32, which are provided running parallel to one another in the vertical direction. Arranged in the battery compartment is a corresponding number of contact springs 34. These contact springs 34, designed as leaf springs, are restrained at their upper end and bear under prestress against the contact lugs 32 of the fitted battery. This prestressing is increased by compression springs 36, which act on the contact springs and ensure reliable contact-making even with the high currents flowing during operation.

As can be seen, the contacting means 32, 34, 36 are separate from the mechanical locking means 18, 22, 24. The design as sliding-action contacts ensures a self-cleaning of the contacts every time the battery is fitted and removed. Even if a movement between the battery or battery housing and battery compartment takes place during operation for some reason or other, the current transfer is not disturbed as a result, because if anything the contacts 32 and 34 slide on one another.

Figure 5:
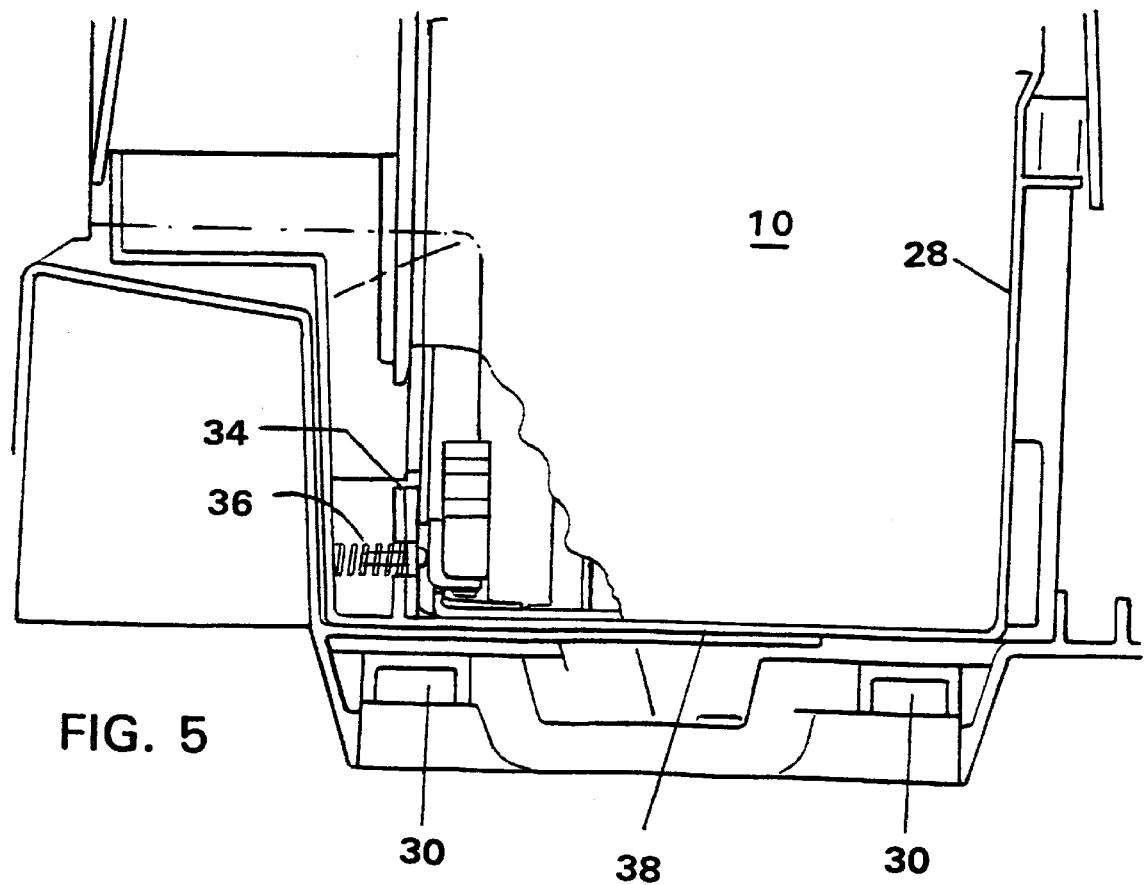
FIG. 5 shows a partial vertical section of the battery holder and battery contacting means.

As can be seen from FIG. 5, the supporting springs 30 may act on a carrier plate 38, which forms the bottom of the battery compartment and supports the battery or its housing.

According to the exemplary embodiment represented, the battery compartment is provided in vertical arrangement in the lawnmower chassis. It is also conceivable, however, to design the compartment horizontally, the supporting means, the locking means and the contacting means having to be designed in a corresponding way, to provide lateral insertion with sliding-action contact connection and lateral locking.

LIST OF REFERENCE NUMERALS

10 Battery (housing)
12 Handle
14 Side legs
16 Spindle
18 Bracket
20 Spindle
22 Lock bolts
24 Interlocking recesses
26 Wall
28 Battery compartment
30 Helical compression springs
32 Contact lugs
34 Contact springs
36 Helical compression springs
38 Carrier plate

I claim:

1. A lawn mower chassis for holding an electric motor of an electric lawn mower, comprising:
    a battery holder including
        an interlock recess on the battery holder for receiving an interlocking member,
        the battery holder having an interior surface, first electrical contacts disposed on the interior surface of the battery holder; and
    a battery for providing electric power to the electric motor, the battery including
        a surface, a handle by which the battery can be placed into and removed from the battery holder, the handle being pivotally mounted to the surface of the battery and pivotable to a first position at the surface of the battery and pivotable to a second position upraised from the surface of the battery,
        second electrical contacts disposed on the battery at locations to contact the first set of electrical contacts when the battery is placed in the battery holder, and
        an interlocking member coupled to the handle in a manner such that after the battery is placed in the battery holder, the interlocking member engages the interlock recess to mechanically secure the battery to the battery holder when the handle is pivoted to the first position and the interlocking member is disengaged from the interlock recess when the handle is pivoted to the second position.

2. The lawn mower chassis of claim 1, wherein in the first position the handle is substantially parallel to the surface of the battery.

3. The lawn mower chassis of claim 2, wherein in the second position, the handle is substantially perpendicular to the surface of the battery.

4. The lawn mower chassis according to claim 1, wherein the battery holder comprises a compartment having walls and a bottom, and the interlock recess is located in an upper region of one of the walls.

5. The lawn mower chassis according to claim 1, wherein the interlocking member is connected to the handle at a point near where the handle is pivotally mounted to the battery.

6. The lawn mower chassis according to claim 5, further comprising a bracket connected across the handle, the interlocking member is joined to the bracket so that the interlocking member is connected to the handle via the bracket.

7. The lawn mower chassis according to claim 1, wherein the handle and the interlocking member are connected so that pivoting the handle between the second and the first positions slides the interlocking member across the battery surface to engage the interlock recess.

8. The lawn mower chassis according to claim 4, further comprising a flexible supporting element disposed on the bottom of the battery holder for supporting the battery when the battery is placed in the battery holder.

9. The lawn mower chassis according to claim 8, wherein the flexible supporting element pushes the interlocking member against a surface defining the interlocking recess when the interlocking member is engaged in the interlocking recess.

10. The lawn mower chassis according to claim 8, wherein the flexible supporting element comprises a compression spring which acts against the battery when the battery is placed in the battery holder.

11. The lawn mower chassis according to claim 1, wherein the first electrical contacts and the second electrical contacts are slidable against each other to provide electrical connection when the battery is placed into the battery holder.

12. The lawn mower chassis according to claim 1, wherein the first electrical contacts are formed as leaf springs and are supported by helical compression springs disposed between the interior surface and the leaf springs.

13. The lawn mower chassis according to claim 1, wherein the battery further includes a battery housing encasing the battery, the handle, the second electrical contacts, and the interlocking member are mounted on the battery housing.

14. The lawn mower chassis according to claim 13, wherein the battery holder and the battery housing include matingly shaped surfaces to align and guide the placement of the battery into the battery holder.

15. In combination, the lawn mower chassis according to claim 1 and a battery recharging unit, the unit having a compartment for receiving the battery, the compartment having an interior surface and third electrical contacts disposed on the interior surface for contacting the second electrical contacts of the battery when the battery is placed in the compartment.

* * * * *